United States Patent [19]
Schneider

[11] Patent Number: 5,806,161
[45] Date of Patent: Sep. 15, 1998

[54] SHAFT SPLINE ALIGNMENT TOOL

[76] Inventor: Danniel Shane Schneider, 1187 Halyard Dr., Santa Rosa, Calif. 95401

[21] Appl. No.: 559,079

[22] Filed: Nov. 16, 1995

[51] Int. Cl.$^6$ ..................................................... B25B 27/14
[52] U.S. Cl. ............................. 29/271; 29/281.5; 29/464
[58] Field of Search .......................... 29/270, 271, 281.5, 29/464

[56]  References Cited

U.S. PATENT DOCUMENTS 3,590,461  7/1971  Siler ........................................... 29/464
4,197,627  4/1980  Hirabayashi et al. .................. 29/281.5
4,841,621  6/1989  Harry ........................................ 29/464
5,295,291  3/1994  Harris ....................................... 29/464

*Primary Examiner*—Robert C. Watson
*Assistant Examiner*—Thomas W. Lynch
*Attorney, Agent, or Firm*—Larry D. Johnson

[57]  ABSTRACT

A tool including a short shaft with splines corresponding to motor shaft splines at one end, and splines corresponding to pump shaft splines at the other end. The tool is placed between a pump and motor so that their respective shafts can be aligned, and the tool is then removed so that the pump and motor can be permanently secured together.

1 Claim, 6 Drawing Sheets

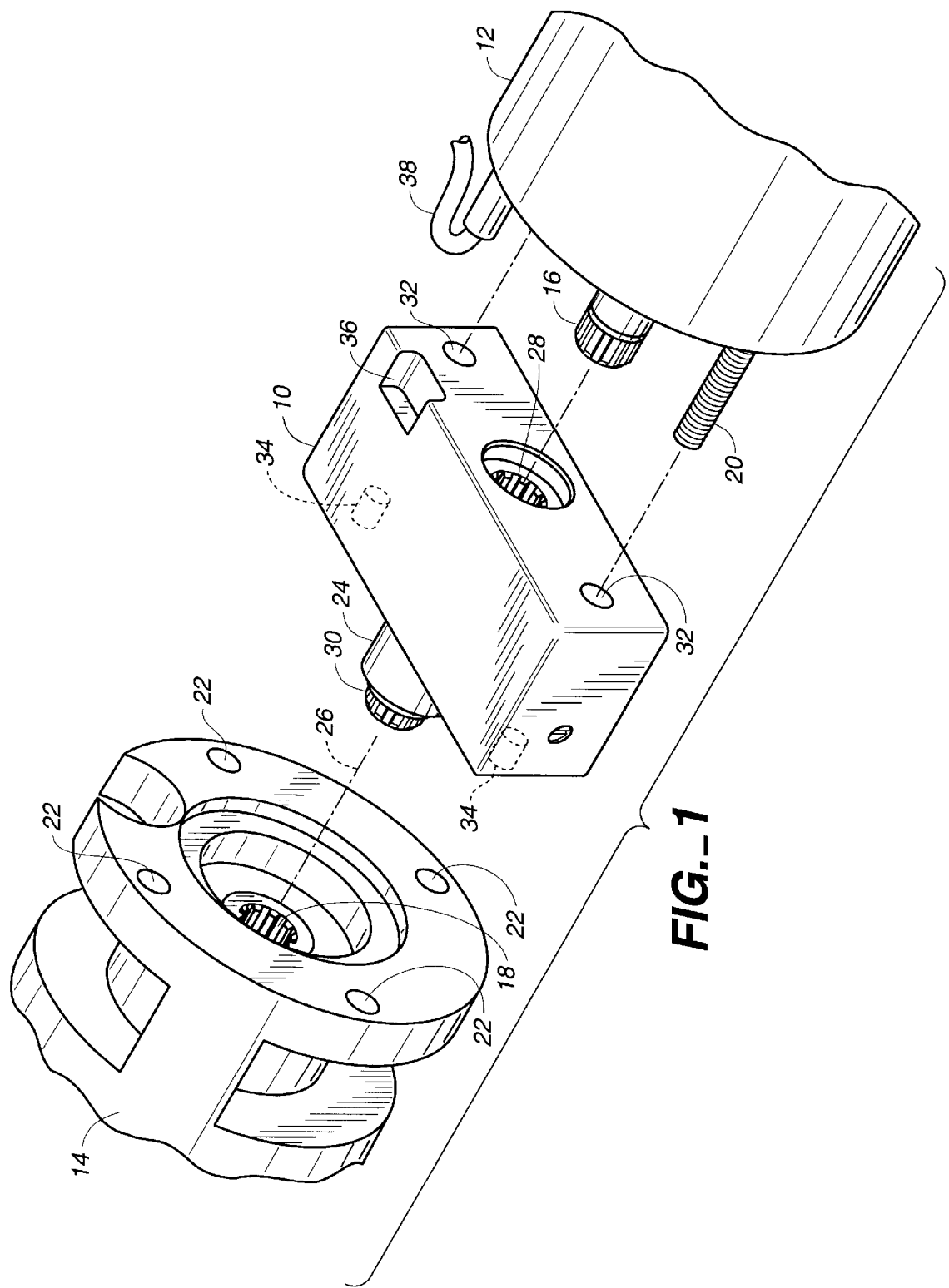

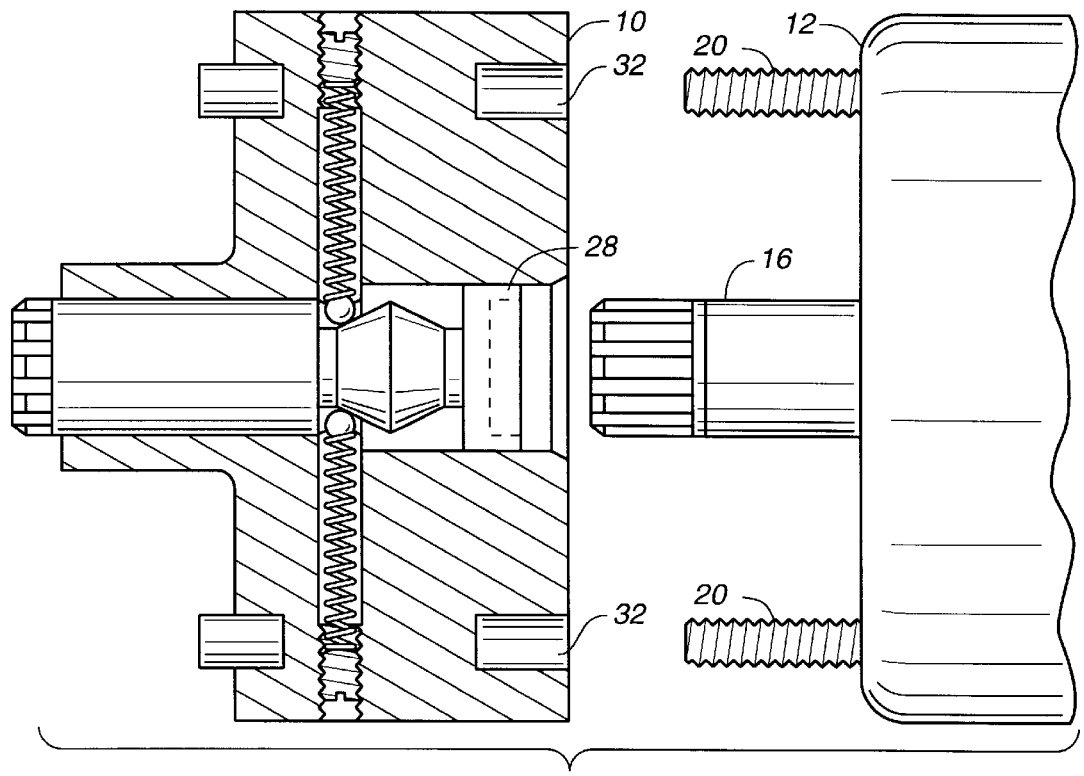
FIG._2
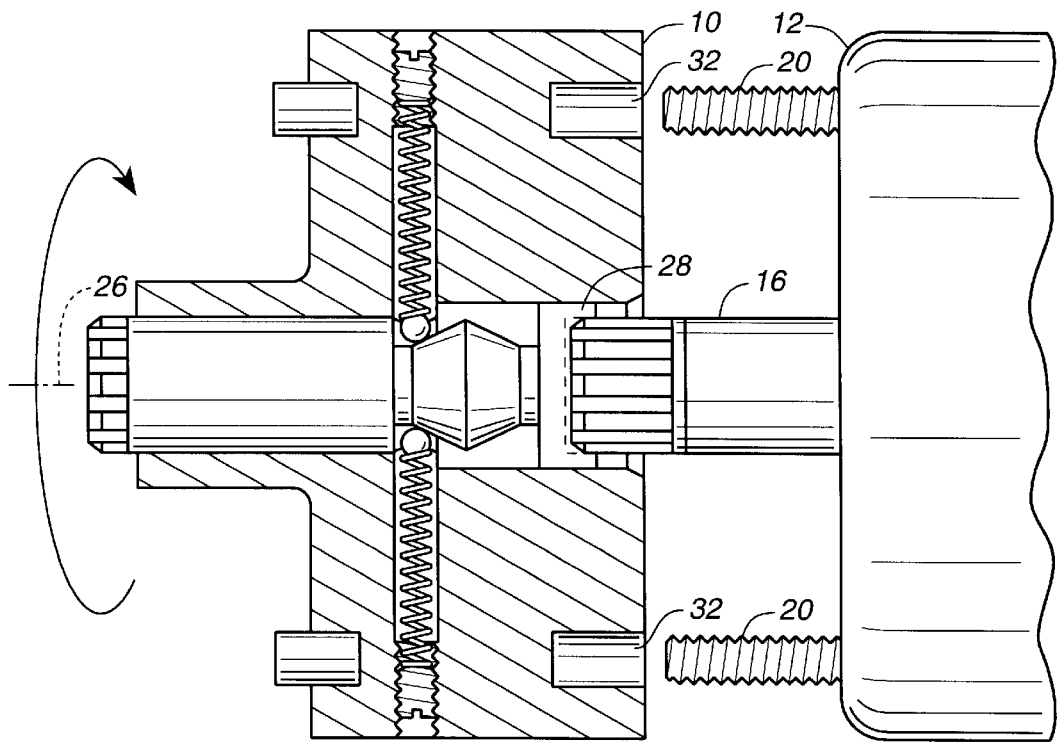
FIG._3

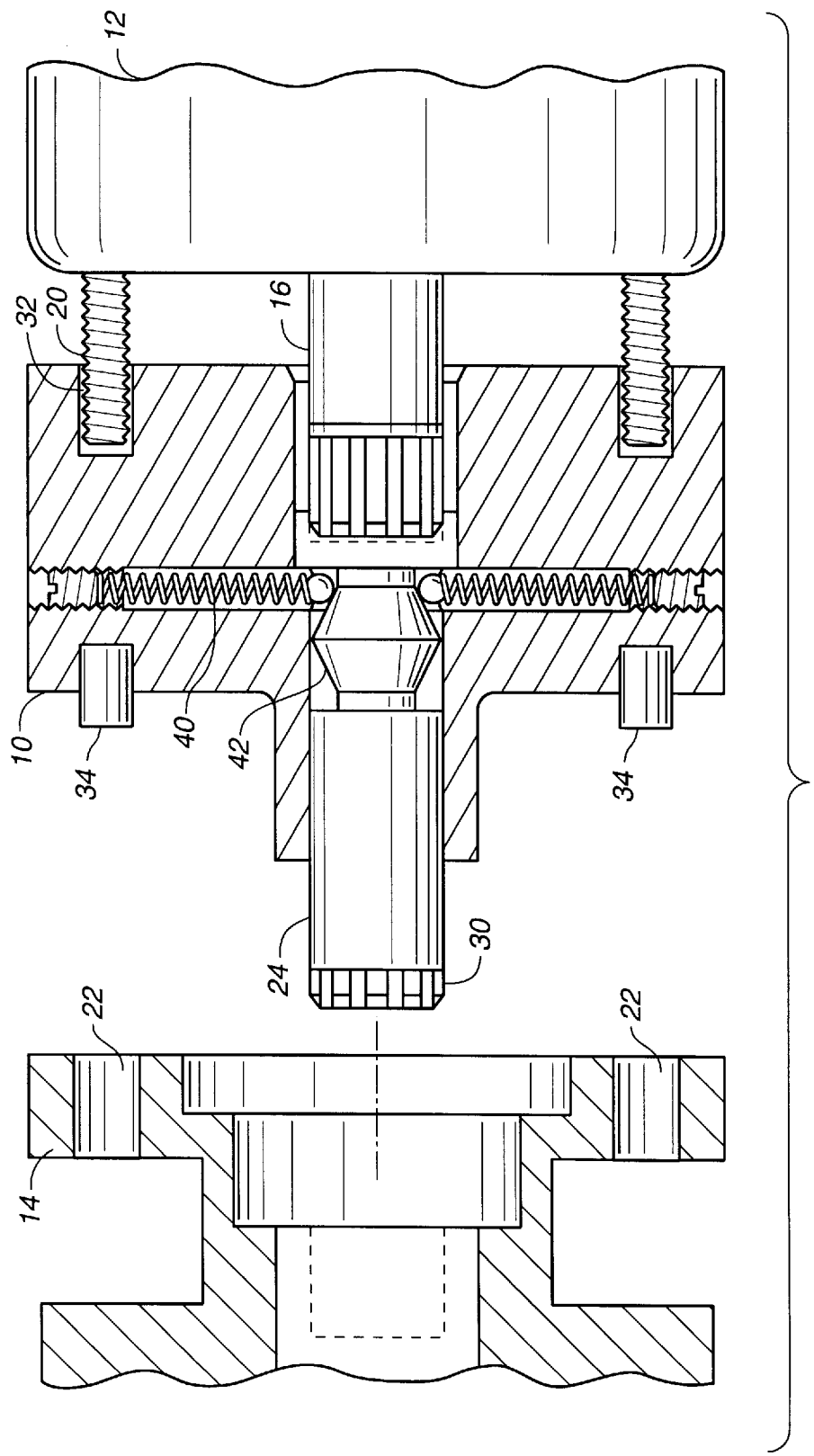
FIG._4

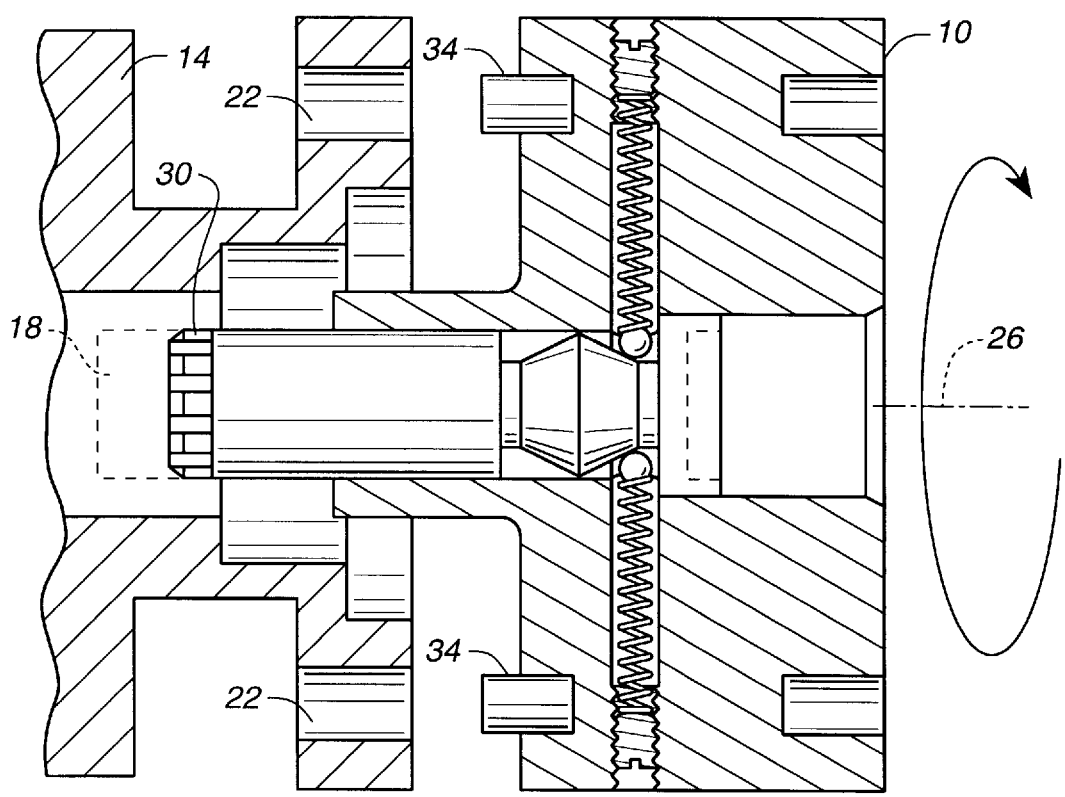
FIG._5

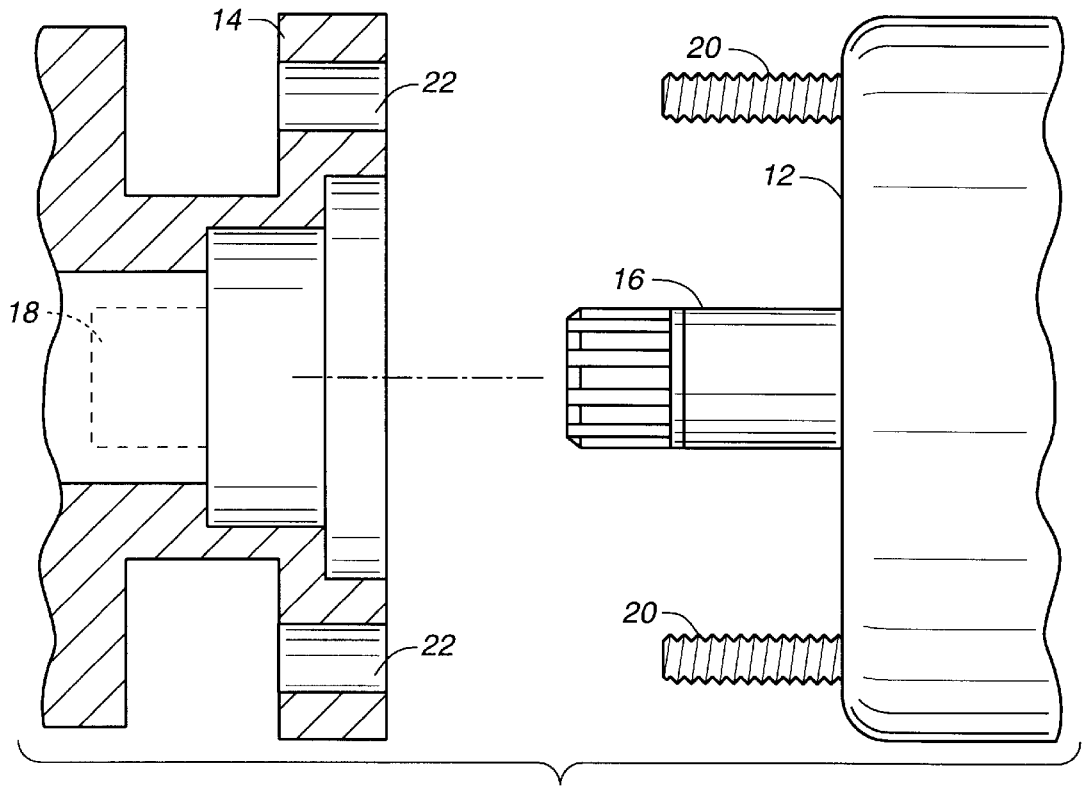
FIG._6
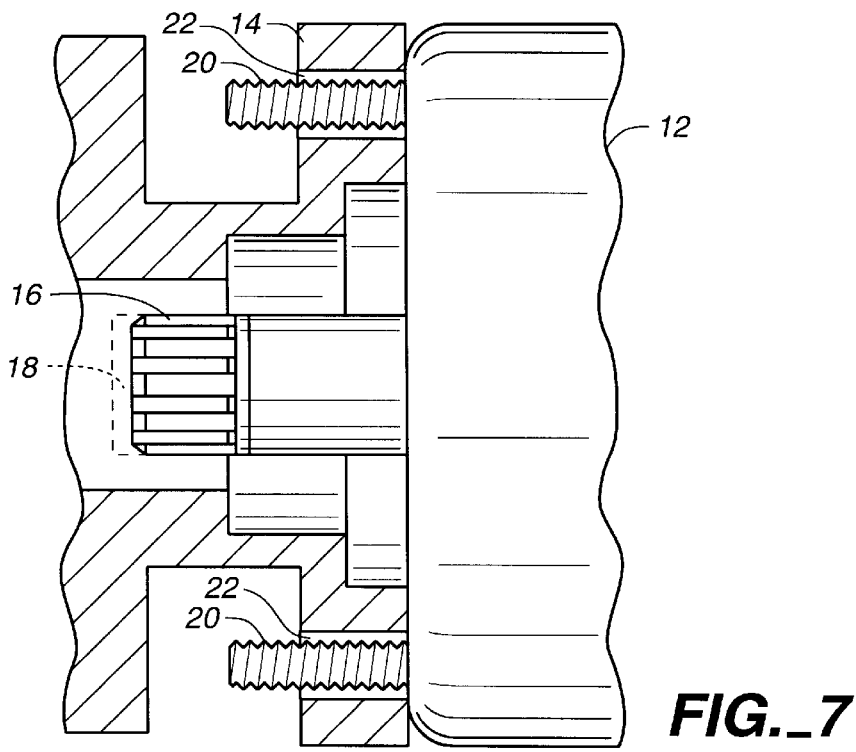
FIG._7

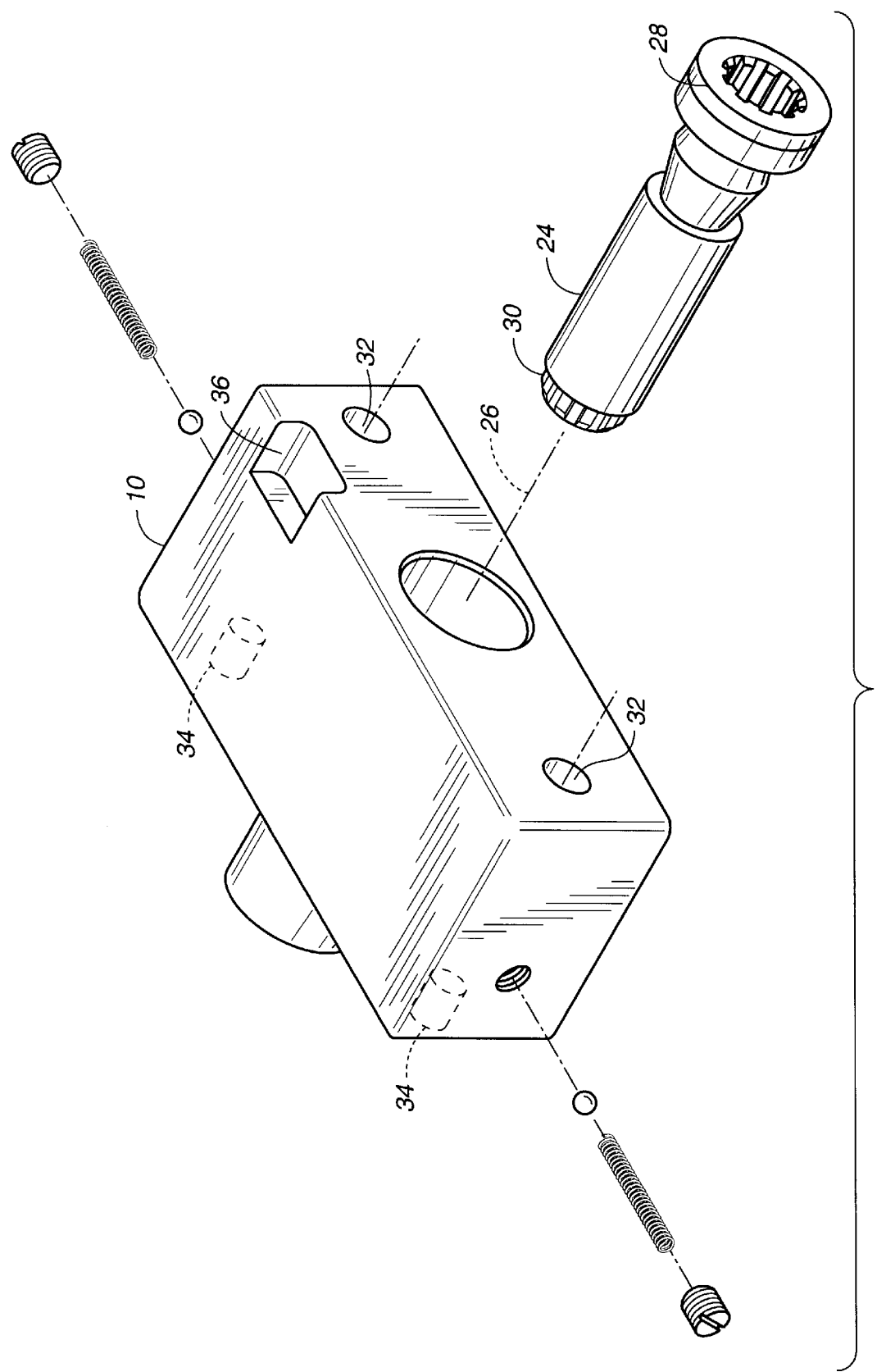
FIG._8

SHAFT SPLINE ALIGNMENT TOOL

BACKGROUND OF THE INVENTION

1. Field of the Invention

This invention relates generally to motors, pumps, and other shaft-bearing devices, and more specifically to an improved tool used to align the shaft splines on motor shafts to be mated to pump shafts.

2. Description of the Prior Art

Submersible pumps (such as those used for domestic water wells) typically include a motor and a pump, each having complementary splined shafts which must be mated for assembly. Traditionally, these components have been manufactured such that the mating process must be done "blind", i.e., a first attempt is made to mate the parts, and unless the splines on the respective shafts just happen to be aligned by chance, the parts are separated, one shaft is turned a slight amount, and another attempt is made. This is often an awkward and time-consuming process.

SUMMARY OF THE INVENTION

The shaft spline alignment tool of this invention provides an apparatus including a short shaft with splines corresponding to motor shaft splines at one end, and splines corresponding to pump shaft splines at the other end. The tool is placed between a pump and motor so that their respective shafts can be aligned, and the tool is then removed so that the pump and motor can be permanently secured together. This accurately aligns the shaft of the motor to the shaft of the pump, making it easier to assemble the motor to the pump.

BRIEF DESCRIPTION OF THE DRAWINGS

FIG. 1 is a partially cutaway perspective view of a shaft spline alignment tool of this invention positioned between a motor and a pump to align the male splined shaft of the motor with the female splined shaft of the pump for assembly;

FIG. 2 is a side elevation view in partial cross-section of the shaft spline alignment tool positioned adjacent the motor and motor shaft;

FIG. 3 is a side elevation view in partial cross-section of the shaft spline alignment tool having been turned about its shaft axis and moved against the motor and motor shaft so that the female splined shaft of the tool has aligned with and become engaged with the male splined shaft of the motor, and the alignment holes of the tool have become aligned with the motor studs;

FIG. 4 is a side elevation view in partial cross-section of the shaft spline alignment tool having been moved further against the motor and motor shaft so that the motor shaft pushes the splined shaft of the tool to its extended position, the alignment holes of the tool have engaged the motor studs, and the tool is brought into position adjacent the pump;

FIG. 5 is a side elevation view in partial cross-section of the shaft spline alignment tool having been moved against the pump and pump shaft so that the male splined shaft of the tool has aligned with and become engaged with the female splined shaft of the pump, and the tool is rotated about its shaft axis so that the alignment studs of the tool are brought into alignment with the stud receiving holes of the pump;

FIG. 6 is a side elevation view in partial cross-section of the shaft spline alignment tool having been removed, and the motor and pump being brought together, the tool having aligned the male splined shaft of the motor with the female splined shaft of the pump, and the studs of the motor with the stud receiving holes of the pump;

FIG. 7 is a side elevation view in partial cross-section of the motor and pump assembled together, the male splined shaft of the motor engaging the female splined shaft of the pump, and the studs of the motor engaging the stud receiving holes of the pump; and FIG. 8 is an exploded perspective view of the component parts of the shaft spline alignment tool of this invention.

DETAILED DESCRIPTION OF A PREFERRED EMBODIMENT

FIG. 1 is a partially cutaway perspective view of a shaft spline alignment tool 10 positioned between a motor 12 and a pump 14 to align the male splined shaft 16 of the motor with the female splined shaft 18 of the pump, and the motor studs 20 with the pump stud receiving holes 22 for assembly. Alignment tool 10 includes an extendable/retractable shaft 24 having a shaft axis 26. This shaft 24 does not turn about its axis 26, but rather extends and retracts relative to the tool body. This can be accomplished by, inter alia, constructing the shaft in a square configuration, incorporation of a tab and groove to prevent turning but permit longitudinal movement, or any other method. One end of the shaft including a female splined shaft 28 for engagement with motor shaft 16, and the other end of the shaft including a male splined shaft 30 for engagement with pump shaft 18, alignment holes 32 for engagement with motor studs 20, and alignment studs 34 for engagement with pump stud receiving holes 22. Tool 10 may include a cavity 36 to avoid interference with motor wire lead 38.

FIG. 2 is a side elevation view in partial cross-section of the shaft spline alignment tool 10 positioned adjacent the motor 12 and motor shaft 16.

FIG. 3 is a side elevation view in partial cross-section of the shaft spline alignment tool 10 having been turned about its shaft axis 26 and moved against the motor 12 and motor shaft 16 so that the female splined shaft 28 of the tool has aligned with and become engaged with the male splined shaft 16 of the motor, and the alignment holes 32 of the tool have become aligned with the motor studs 20.

FIG. 4 is a side elevation view in partial cross-section of the shaft spline alignment tool 10 having been moved further against the motor 12 and motor shaft 16 so that the motor shaft 16 pushes the splined shaft 24 of the tool to its extended position, the alignment holes 32 of the tool have engaged the motor studs 20, and the tool is brought into position adjacent the pump 14. The shaft 24 may be stabilized in either its extended or retracted position by springs 40 acting against inclined surfaces 42 to resist lateral movement of the shaft, or in any other manner well known in the art.

FIG. 5 is a side elevation view in partial cross-section of the shaft spline alignment tool 10 having been moved against the pump 14 and pump shaft 18 so that the male splined shaft 30 of the tool has aligned with and become engaged with the female splined shaft 18 of the pump, and the tool 10 is rotated about its shaft axis so that the alignment studs 34 of the tool are brought into alignment with the stud receiving holes 22 of the pump.

FIG. 6 is a side elevation view in partial cross-section of the shaft spline alignment tool having been removed, and the motor 12 and pump 14 being brought together, the tool having aligned the male splined shaft 16 of the motor with the female splined shaft 18 of the pump, and the studs 20 of the motor with the stud receiving holes 22 of the pump.

FIG. 7 is a side elevation view in partial cross-section of the motor 12 and pump 14 assembled together, the male splined shaft 16 of the motor engaging the female splined shaft 18 of the pump, and the studs 20 of the motor engaging the stud receiving holes 22 of the pump.

FIG. 8 is an exploded perspective view of the component parts of the shaft spline alignment tool 10 of this invention, including extendable/retractable shaft 24 having a shaft axis 26, a female splined shaft 28 for engagement with the motor shaft, a male splined shaft 30 for engagement with the pump shaft, alignment holes 32 for engagement with the motor studs, alignment studs 34 for engagement with the pump stud receiving holes, and cavity 36 to avoid interference with the motor wire lead.

Typical use instructions for the inventive tool might include the following:

Place the tool directly over the center of the motor, gently applying downward pressure while turning the tool in either direction until both splines are interlocked. While the tool is still in place, turn the tool in either direction until the alignment holes of the spline tool are directly over the motor studs, then push downward until the spline tool stops and the shaft of the tool lifts off of the motor shaft.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A shaft spline alignment tool to align the male splined shaft and motor studs of a motor with the female splined shaft and stud receiving holes of a pump for assembly, said alignment tool comprising:

an extendable/retractable shaft having a shaft axis and a pair of ends, one end including a female splined shaft for engagement with the motor shaft, the other end including a male splined shaft for engagement with the pump shaft, said alignment tool further comprising alignment holes for engagement with the motor studs, and alignment studs for engagement with the pump stud receiving holes.

* * * * *